C. C. HANSEN.
PRESSURE REDUCING VALVE.
APPLICATION FILED JUNE 12, 1918.

1,378,026.

Patented May 17, 1921.

Witness:
John Enders

Inventor:
Charles C. Hansen
by Fred Gerlach
his Atty.

UNITED STATES PATENT OFFICE.

CHARLES C. HANSEN, OF FOREST PARK, ILLINOIS, ASSIGNOR TO REFRIGERATING SPECIALTIES CO., OF CHICAGO, ILLINOIS, A CORPORATION OF ILLINOIS.

PRESSURE-REDUCING VALVE.

1,378,026.  Specification of Letters Patent.  Patented May 17, 1921.

Application filed June 12, 1918. Serial No. 239,689.

*To all whom it may concern:*

Be it known that I, CHARLES C. HANSEN, a citizen of the United States, and a resident of Forest Park, in the county of Cook and State of Illinois, have invented certain new and useful Improvements in Pressure-Reducing Valves, of which the following is a full, clear, and exact description.

The invention relates to combined automatic expansion and reducing valves which are more particularly adapted for use in refrigerating systems wherein packing is objectionable because ammonia gas is handled.

One object of the invention is to provide a combined expansion and reducing valve for ammonia refrigerating systems.

In the use of expansion valves, heretofore, it has been found that leakage from the high pressure side to the low pressure side sometimes results from the inefficiency of, or imperfections in, packing relied upon to form a fluid-tight joint between the high pressure and low pressure sides of the system, or the failure of the cap to jam the valve cage and packing in place. One object of the invention is to provide an improved valve of this character, in which packing or a gasket is dispensed with, and another object is to provide a valve of this character, which is simple in construction and efficient in operation.

The invention consists in the several novel features hereinafter set forth and more particularly defined by claims at the conclusion hereof.

Figure 1:
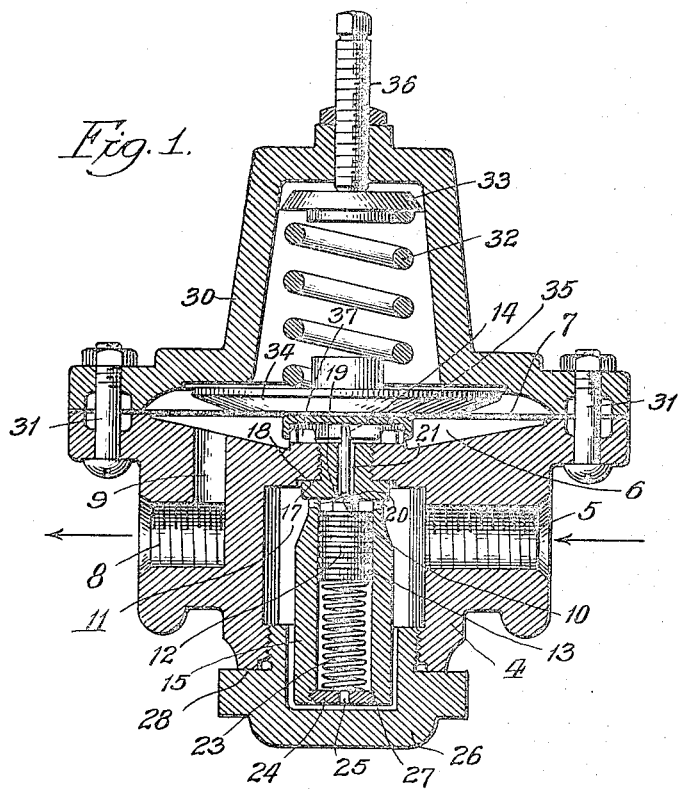
Figure 2:
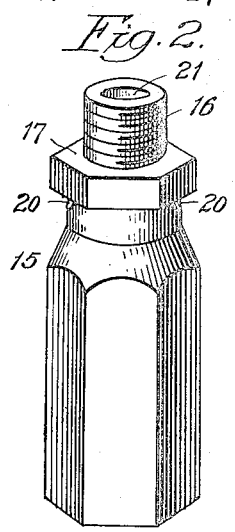

In the drawings: Figure 1 is a section of a valve embodying the invention. Fig. 2 is a perspective of the valve container and its contents.

The improved valve embodies a casing comprising a chambered body 4 provided with a suitable inlet 5 which is adapted to be connected to the high pressure side of a refrigerant line, a chamber 6 formed in the top of the casing and having a top formed by a flexible diaphragm 7, and an outlet 8 adapted for connection to a pipe connected to the low pressure side of the refrigerant line. The outlet 8 is in constant communication with the chamber 6 through a duct 9. A needle valve 10 is provided to control the passage of fluid to chamber 6 from the chamber 11 which is in constant communication with the inlet 5, and also to slowly discharge the liquid ammonia so it will vaporize as it passes into the low pressure side of the refrigerant line. This valve is provided with a piston 12 having lubricant grooves 13 therein and a stem 14 which is extended upwardly for operation in response to the movement of the diaphragm 7. The valve 10, piston 12, and stem 14 all move together and are mounted in a cylindrical container 15 which is removably secured in the casing 4 by a screw-threaded nipple 16 at its upper end. The valve-container 15 is provided with an annular shoulder 17 adapted to engage a seat 18 and this shoulder and seat are ground to form a metal-to-metal fluid-tight joint, so that no gaskets or packing is necessary to prevent leakage between the chamber 11 and the chamber 6. A seat 19 for valve 10 is formed in the container, and ducts 20 in the container permit fluid to pass from chamber 11 into the container and around the valve 10, so that when the latter is open, the fluid will pass through a duct 21 around the valve-stem 14 to the chamber 6. Valve 10 is held normally closed by a spring 23 interposed between one end of the piston 12 and a plug 24, which is screw-threaded into the lower end of the container 15. A duct 25 is formed in the plug to expose the lower end of the piston 12 to the pressure of fluid in chamber 11. A cap 26 is screw-threaded into the lower end of the casing-body 4 and serves as a removable closure for the chamber 11. A space 27 is left between the valve-container and the cap 26 so that the container 15 may be forced against the seat 18 independently of the cap and the cap may be forced against the seat 28 on the casing 4 independently of the container and also so that fluid in the chamber 11 can pass into the container through port 25.

This construction exemplifies one in which the cylindrical container, which is adapted to form a metal-to-metal joint with a seat in the casing, is adapted to be removed from the casing as an entity with its contents and in which the cage is seated independently of the cap. As a result, the valve container can be readily removed or replaced and when removed, the valve 10 and valve seat 19 may be reground, plug 24 permitting the ready withdrawal of the spring 23 and the valve. When the cap 26 is removed, the spring 23 will remain in the cylindrical cage until plug 24 is removed from the cage. The outer periphery of the cage is hexagonal so it can be easily turned by a wrench when the cap 26 is removed.

The diaphragm 7 is secured to the casing 4 by a member 30 which is secured to the casing by bolts 31. A spring 32 engaged by an adjustable plate 33 and engaging a plate 34, which abuts against the top of the diaphragm 7, serves to press the diaphragm and a plate 35 on the underside thereof downwardly, to force the valve stem 14 downwardly and open the valve 10 when the pressure in the chamber 6 falls below the predetermined minimum. By an adjusting screw 36, the force of the spring 32 may be varied. Plate 35 has a depending flange which is guided on upstanding lugs 37 of the casing 4.

In operation, assuming the valve to be closed and the pressure in the low pressure side of the line to fall to such an extent that fluid should be admitted to restore the pressure, the spring 32 will overcome the pressure of fluid in chamber 6 and will act on diaphragm 7 to force the plate 35 downwardly and open the valve 10, whereupon high pressure or liquid ammonia will pass from chamber 11 through ducts 20 and 21 and be impacted against plate 35 and thence outwardly against the flange of said plate and lugs 37, which will assist in breaking up and vaporizing the liquid into the chamber 6. When pressure in the chamber 6 has been raised sufficiently, the fluid acting on the underside of diaphragm 7 will lift the diaphragm and release the valve stem 14 so that valve 10 will be closed by spring 23.

The invention exemplifies an improved pressure-reducing valve adapted for refrigerating systems, in which packings are avoided, and which is simple and efficient in operation.

This application contains matter which is a division of the invention set forth in an application filed by me May 19, 1916, serially numbered 98,546.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A pressure reducing valve comprising a casing, means to connect the casing to a high pressure line, means to connect the casing to a low pressure line, a valve for controlling the passage of fluid to the low pressure connection, a container in which said valve is slidably mounted, and having a valve seat therein, a screw-threaded and metal-to-metal connection between the container and the casing, a piston on the valve slidable in the container, a spring for closing the valve, a diaphragm operated by fluid in the low pressure side of the line for opening the valve, and a cap screw-threaded to the casing and seated therein independently of said cage.

2. A pressure reducing valve comprising a casing, means to connect the casing to a high pressure line, means to connect the casing to a low pressure line, a valve for controlling the passage of fluid to the low pressure connection, a container in which said valve is slidably mounted, a screw-threaded and metal-to-metal connection between the container and the casing, a piston on the valve slidable in the casing, a spring for the valve mounted in and removable with the casing, means to hold the spring in the casing, a diaphragm operated by fluid in the low pressure side of the line for opening the valve, and a cap screw-threaded to the casing and seated therein independently of said cage.

3. A combined pressure reducing and ammonia expansion valve comprising in combination a casing having an expansion chamber therein, means to connect the casing to a high pressure line, means to connect the casing to a low pressure line, a needle valve slidably held in said casing for controlling the passage of fluid to the low pressure connection, a diaphragm exposed to pressure in the low pressure connection, adapted to open and movable independently of the needle valve, a spring acting upon the diaphragm and against the action of the fluid pressure thereon, and means against which fluid from the valve will impact to assist in vaporization of the fluid, comprising a surface transverse to the direction of the fluid as it is discharged by the valve and retarding means for the fluid associated with said surface.

4. A combined pressure reducing and ammonia expansion valve comprising in combination a casing having an expansion chamber therein, means to connect the casing to a high pressure line, means to connect the casing to a low pressure line, a needle valve slidably held in said casing for controlling the passage of fluid to the low pressure connection, a diaphragm exposed to pressure in the low pressure connection, adapted to open and movable independently of the needle valve, a spring acting upon the diaphragm and against the action of the fluid pressure thereon, and a plate in the expansion chamber against which fluid from the valve will impact to assist in vaporization of the fluid provided with means to retard the flow away from the plate.

5. A combined pressure reducing and ammonia expansion valve comprising in combination a casing having an expansion chamber therein, means to connect the casing to a high pressure line, means to connect the casing to a low pressure line, a needle valve for controlling the passage of fluid to the low pressure connection, a container in which the valve is slidably held, removably secured in the casing, a diaphragm exposed to pressure in the low pressure connection and adapted to open the needle valve, a spring acting upon the diaphragm and against the action of the fluid pressure thereon, and means against which fluid from the valve will impact to assist in vaporization of the fluid.

6. A pressure reducing valve comprising a casing, means to connect the casing to a high pressure line, means to connect the casing to a low pressure line, a valve for controlling the passage of fluid to the low pressure connection, a container in which said valve is slidably mounted, a screw-threaded and metal-to-metal connection between the container and the casing, a piston on the valve and in the casing, a spring for the valve in the casing, a plug to hold the spring in the casing, a diaphragm operated by fluid in the low pressure side of the line for opening the valve, and a cap screw-threaded to the casing and seated therein independently of said cage, a space being formed between the cap and the container.

CHARLES C. HANSEN.